United States Patent [19]
Smith

[11] Patent Number: 5,620,063
[45] Date of Patent: Apr. 15, 1997

[54] THREE SECTION PAD IN CALIPER DISC BRAKES

[75] Inventor: Philip J. Smith, West Midlands, United Kingdom

[73] Assignee: Alcon Components Limited, Tamworth Staffs, Great Britain

[21] Appl. No.: 550,070

[22] Filed: Oct. 30, 1995

[30] Foreign Application Priority Data

Nov. 2, 1994 [GB] United Kingdom ............... 9422056

[51] Int. Cl.$^6$ ............................................. F16D 65/04
[52] U.S. Cl. .................................... 188/73.2; 188/240
[58] Field of Search ............................ 188/72.5, 73.1, 188/73.2, 238, 239, 240, 242, 243, 244, 73.37, 73.38, 73.39, 73.41, 73.42, 73.43, 73.44, 73.45, 73.47

[56] References Cited

U.S. PATENT DOCUMENTS

| | | | |
|---|---|---|---|
| 2,904,138 | 9/1959 | Wilson | 188/240 |
| 3,605,967 | 9/1971 | Warren et al. | 188/73.2 |
| 3,605,968 | 9/1971 | Ely | 188/73.2 |
| 3,698,519 | 10/1972 | Crossman | 188/73.2 |
| 5,103,939 | 4/1992 | Schroeter | 188/73.47 |
| 5,477,944 | 12/1995 | Bryan et al. | 188/72.5 |

*Primary Examiner*—Matthew C. Graham
*Attorney, Agent, or Firm*—Learman & McCulloch

[57] ABSTRACT

A disc brake caliper is made to receive a series of pads extending circumferentially of the disc. Each pad is pressurised by a pair of pistons including a smaller piston located radially outwardly and a larger piston located radially inwardly. All of the pistons and cylinders are connected together for common hydraulic pressurization. The arrangement provides better distribution of the braking force, and greater equalization of pad wear. The relatively greater area of pistons as compared to the pad area also contributes towards more even braking force, whilst the smaller diameter pistons and cylinders, as compared to what would be necessary if only a single piston and cylinder were used, enables shorter cylinder length and hence a slimmer and lighter caliper without risk of pistons tilting and jamming.

6 Claims, 2 Drawing Sheets

THREE SECTION PAD IN CALIPER DISC BRAKES

This invention relates to disc brakes especially for competition vehicles for example racing cars. These differ from those used on less powerful, or more gently driven vehicles because they are operated more frequently and more fiercely yet are required to be of minimum weight. Such disc brakes are called racing brakes in this specification

BACKGROUND OF THE INVENTION

A conventional disc brake comprises a so-called caliper often made from two separate parts which are held together by pairs of bolts so as to be of generally U-shape in cross-section. A portion of the brake disc is received between the limbs of the U. The bolts are parallel to the axis of the disc. The interior portion of each of these parts extends arcuately over the segment of the disc and provides a cavity to locate a brake pad and guide the same for relatively small movements parallel to said axis in brake application. This is effected by a hydraulic mechanism comprising a piston and a cylinder, and again the axes of these parts are parallel to the axis of rotation.

One problem which is faced by the designer of racing brakes is the need to provide a large pad area. However, long pads tend to wear more at their leading edges so that they become wedge-shaped in cross-section and this necessitates replacement at more frequent intervals than would otherwise be the case.

The maximum length of the pad, peripherally of the disc, is governed by the spacing between one of the mentioned pairs of bolts, since pads require to be inserted in a radial direction and pass through a clearance between those bolts, or an equivalent dimension if the caliper is one-piece.

SUMMARY OF THE INVENTION

According to the invention a racing brake has a caliper comprising a pair of limbs having an opening for pad insertion, and having a series of more than two pads in each limb, said opening having a peripheral length less than the equivalent dimension of the series of pads, the first and last pads in the series extending beyond the opening at opposite ends thereof, whereby first and last pads of the series may be inserted through said opening and then moved circumferentially in opposite directions into the required positions before inserting the intermediate pad(s) in the series into position.

If the caliper is made of two parts bolted together, the pads will be Located radially inwardly of those bolts, and the opening will extend between two of those bolts.

Preferably each pad is associated with a plurality of piston and cylinder devices, instead of with a single piston and cylinder device. This is based on the inventor's recognition that any piston desirably has a minimum length relative to its diameter in order to prevent the piston tilting and possibly jamming in its cylinder bore, although increased piston friction, which causes slower piston movement and/or increases the pressure necessary for brake operation occurs at length/diameter ratios below those at which jamming occurs, but which equally are best avoided. A like pressurization effect can be better distributed over the pad area with short cylinder lengths without the tilting risk if the plurality is used as compared to the possibility of using a single larger piston and cylinder, because it involves lower diameter/length ratios. Shorter cylinder length also means a slimmer caliper limb and hence reduced weight.

In a preferred arrangement, each pad is pressurized by a pair of piston and cylinder mechanisms using larger diameter piston and cylinders located radially inwardly and smaller diameter piston and cylinders located radially outwardly, but with the cylinders for each pad disposed on opposite sides of a radius of the disc. This arrangement is particularly effective in enabling the cylinders to alternate with cooling passages which also serve the purpose of reducing the caliper volume and hence weight.

DESCRIPTION OF THE DRAWINGS

One embodiment of the invention is described with reference to the accompanying drawing wherein.

DETAILED DESCRIPTION

Figure 1:
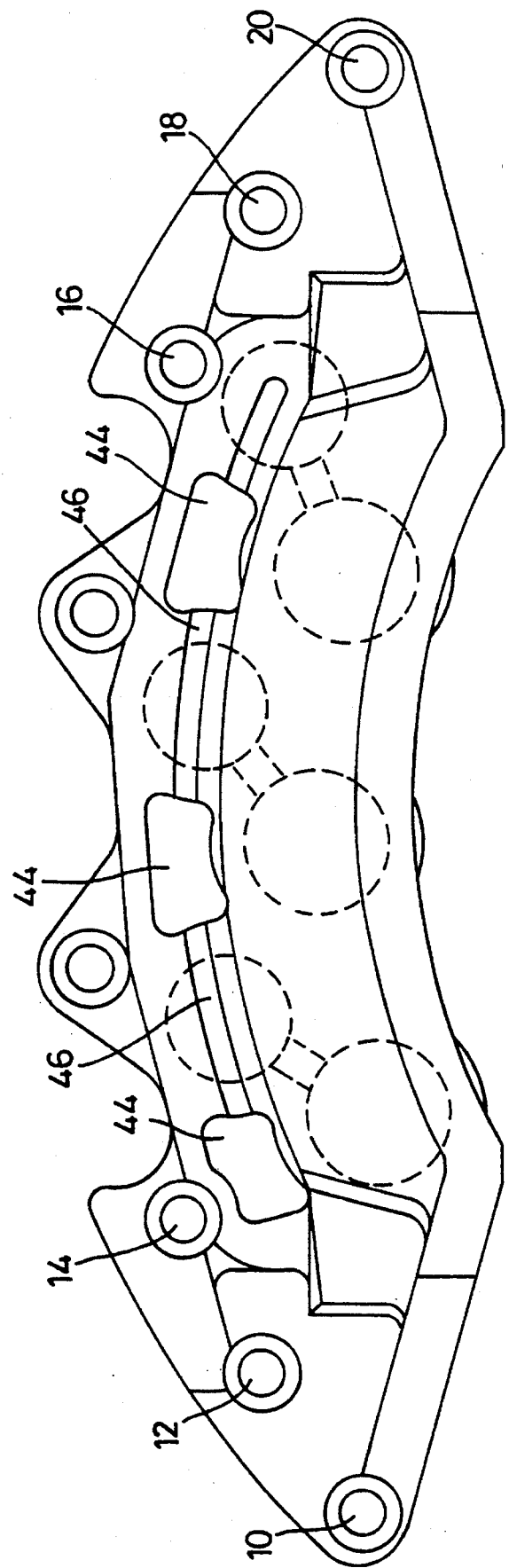
FIG. 1 is a view of one side of a limb of the caliper and FIG. 2 is a fragmentary view of the opposite side of the same.

Referring first to FIG. 1 which shows a two-piece caliper, the apertures 10,12, 14,16,18,20 are provided for bolts which clamp two similar limbs together leaving an inverted U-section cavity between the two for the disc to pass between. When the brake is assembled in position, the bolts 14, 16 substantially define a gap therebetween for pad insertion and removal in a radial direction.

Figure 2:
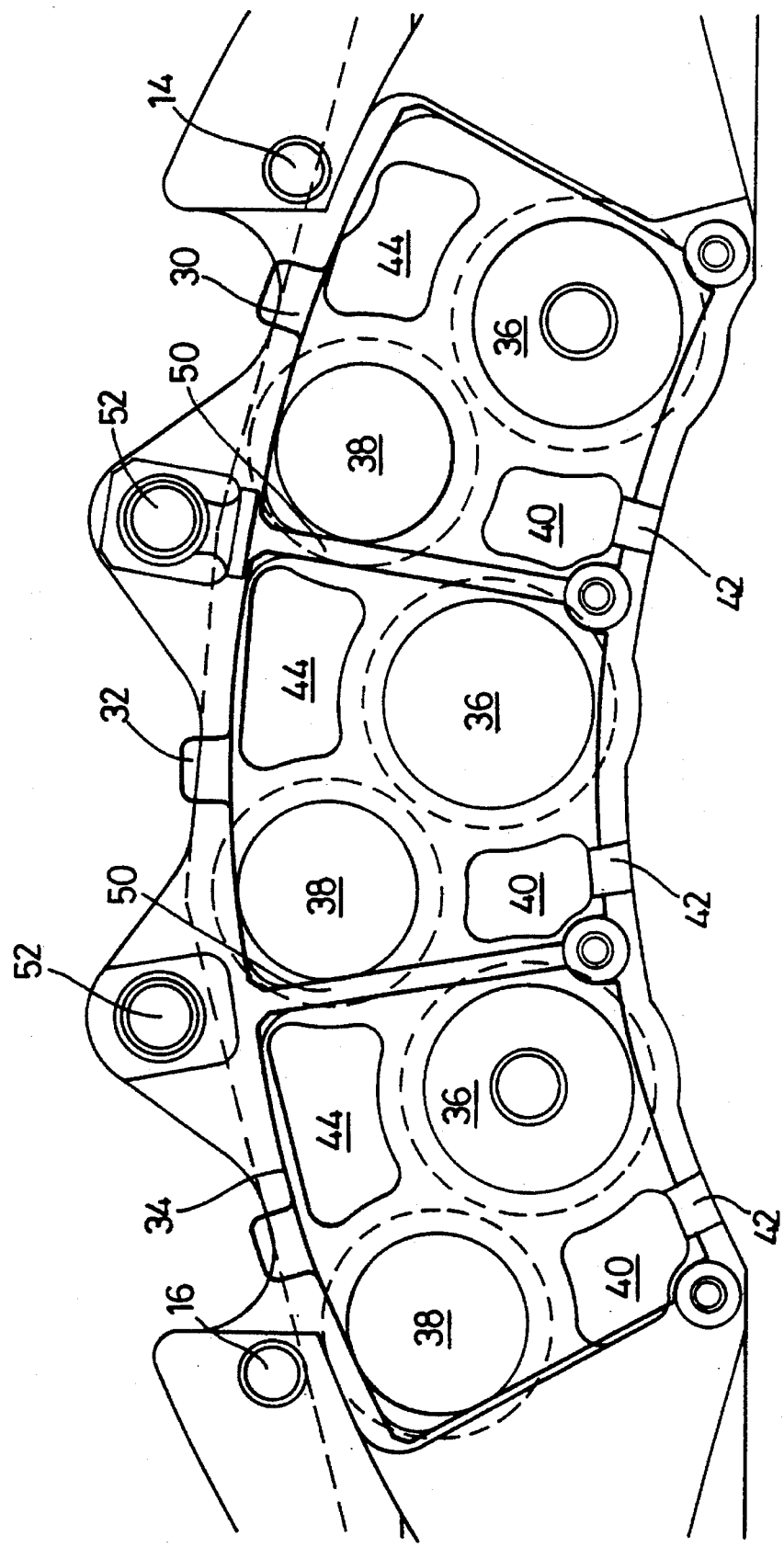

Turning now to FIG. 2, the areas occupied by the pads can be seen. In this instance three pads are used in the series (in each limb) namely pads 30, 32 and 34. Each pad is pressurized by a pair of piston and cylinder devices as mentioned, and the larger pistons 36 are radially inwards and towards the trailing end of the pad, whereas the smaller pistons 38 are radially outwards and towards the leading end. It will be appreciated that all of the cylinders are connected together for hydraulic fluid pressurization so as to displace the pads against the disc.

The inner row of pistons and cylinders alternates with air spaces 40 which open radially inwardly of the caliper through passages 42 and the outer row alternates with voids 44 which are connected together by passages 46 (FIG. 1) and also to the exterior so as to encourage air flow through the brake in use.

Pad insertion consists of inserting pad 30 for example generally in the position of the pad 32 and then moving it circumferentially so that the pad underlies the bolt 14 and then similarly in the case of the pad 34 to underlie the bolt 16. The remaining pad 32 is then inserted into position and dividers 50 are slid into place and retained by fixing screws 52.

The arrangement illustrated enables a great braking force to be provided in a relatively slim caliper thus reducing weight, and because of the particularly good air flow characteristics with reduced fade and uniformity of pad wear because of the pad number and piston and cylinder distribution arrangements.

In a modification not shown, a one-piece caliper is similarly arranged.

I claim:

1. A racing brake caliper comprising a pair of limbs, having an opening for pad insertion and having a series of more than two pads in each limb, said opening having a peripheral length less than the equivalent dimension of the series of pads, the first and last pads in the series extending beyond the opening at opposite ends thereof, whereby first and last pads of the series are inserted through said opening and then moved circumferentially in opposite directions into the required positions before inserting the intermediate pads in the series into position.

2. A racing brake as claimed in claim 1 wherein the caliper is made of two parts bolted together, the pads being located radially inwardly of those bolts, and the opening extending between the bolts.

3. A racing brake as claimed in claim 1 wherein each pad is associated with a plurality of piston and cylinder devices.

4. A racing brake as claimed in claim 1 wherein each pad is provided with a smaller piston and cylinder and a larger piston and cylinder.

5. A racing brake as claimed in claim 4 wherein the smaller piston is located radially outwardly of the larger piston and the smaller piston is towards the leading end of the pad.

6. A racing brake as claimed in claim 1 wherein a divider is located between each two pads and is fixed in position by a screw.

* * * * *